US006442143B1

(12) United States Patent
Corry (10) Patent No.: US 6,442,143 B1
(45) Date of Patent: Aug. 27, 2002

(54) SIGNAL QUALITY MAINTENANCE IN A COMMUNICATION SYSTEM (75) Inventor: Robert John Corry, Collegeville, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/410,257

(22) Filed: Sep. 30, 1999

(51) Int. Cl.[7] .................................................. H04Q 7/20
(52) U.S. Cl. .................. 370/252; 370/332; 370/278; 370/316; 370/318; 370/333; 455/69; 455/522; 455/13.4; 375/260; 375/285
(58) Field of Search ................................ 370/252, 278, 370/281, 316, 317, 318, 319, 321, 332, 333, 337, 344, 477, 478, 468; 375/260, 285; 455/69, 522, 12.1, 10, 13.4, 63

(56) References Cited

U.S. PATENT DOCUMENTS 5,978,365 A * 11/1999 Yi ............................... 370/331
6,201,795 B1 * 3/2001 Baum et al. ................. 370/252

\* cited by examiner

*Primary Examiner*—Lee Nguyen
*Assistant Examiner*—Eugene Yun
(74) *Attorney, Agent, or Firm*—Duane Morris LLP (57) ABSTRACT

A method for operating a communication system which is subject to fading and interference includes an arrangement at a user terminal andor a gateway for determining the received signal strength. If the received signal strength is low, a fade is declared. The received signal quality is also determined, as for example by determining the bit error rate of the signal. If the signal quality is deemed to be poor and faded, the poor signal quality is deemed to be attributable to the fade, and the coding gain of the path is increased, as for example by increasing the bearer rate without increasing the information rate. If the signal quality is deemed to be poor in the absence of fading, the poor signal quality is deemed to be due to interference. If interference is found in this way, the carrier channel is changed, as for example by changing slot allocation in a TDMA system or channel frequency in an FDMA system, without change in the coding gain. In a particularly advantageous mode of the invention, the user terminal encodes the signal level and signal quality information and transmits corresponding indices to a gateway, at which the necessary processing is performed, and which commands the user terminal. In a preferred mode, both directions of signal propagation are modified in response to a fade or poor-quality signal detected at either end of the system.

9 Claims, 5 Drawing Sheets

SIGNAL QUALITY MAINTENANCE IN A COMMUNICATION SYSTEM

FIELD OF THE INVENTION

This invention relates to communication systems, and more particularly to communication systems subject to noise and interference.

BACKGROUND OF THE INVENTION

In a spacecraft-based cellular communication system, such as those described generally in U.S. Pat. No. 5,717,686, issued Feb. 10, 1998 in the name of Schiavoni; U.S. Pat. No. 5,875,182, issued Feb. 23, 1999 in the name of Hatzipapafotiou; U.S. Pat. No. 5,907,541, issued May 25, 1999 in the name of Fairholm et al.; and allowed patent application Ser. No. 08/961,938, filed Oct. 31, 1997 in the name of Hudson, the spacecraft produces multiple partially-overlapping antenna "spot" beams, within which the various user terminals are located. Many of the user terminals are mobile, and from time to time may be found variously near the center of a spot beam in a location where the signal strength is great, and near the overlap region between beams, where the signal strength is weaker. Since the available spectrum is limited, the maximum possible service is provided by frequency re-use among the various spatially diverse spot beams. That is to say, that ideally the operating frequency band of a given spot beam is different from the operating frequency band of adjacent spot beams, but may be the same as the operating frequency band as semi-adjacent spot beams. The angular separation of antenna spot beams is selected to provide an estimated acceptable level of interference attributable to coupling of same-frequency-band signals between antenna beams. Nevertheless, these estimates are based on statistical measures, which may not be applicable to particular channels at particular times or channel loadings, with the result that some channels may experience interference in excess of the desired or acceptable amount.

SUMMARY OF THE INVENTION

A method for maintaining the quality of a signal transmission over a signal path, according to an aspect of the invention, includes the step of sensing the strength of at least a portion of the received signal resulting from traversal of the path in a first direction. The signal strength or level is compared with a predetermined threshold and the signal is deemed not to have faded if the signal level remains above the threshold, and to have faded if the signal level drops below the predetermined threshold. The signal quality or bit error rate of the received signal is sensed or determined, and the signal is deemed to be of poor quality if the quality drops below a predetermined threshold. If the signal level is indicative of a fade, and the signal quality is poor, the poor signal quality is deemed to be due to the fade, and the effects of the low signal level are mitigated by maintaining the same information rate while increasing the coding gain. For example, doubling of the bearer rate while maintaining the information rate allows one to use more coding bits, which results in an increase of coding gain. When the faded signal is found in one link direction, such as at the user terminal or at the gateway, the coding gain need be increased only in the faded direction; it often occurs, however, that the fade occurs in both directions, and it may be desirable to increase the coding gain in both directions of propagation. In a preferred embodiment of the invention, identification of fading in either direction results in an increase in coding gain in both directions of propagation. If the signal level is above the threshold and thus not indicative of a fade, but the signal quality is poor, the poor signal quality is deemed to be attributable to interference.

When interference is detected in this manner, at least one of the slot and the frequency of the channel are changed, while maintaining the same bearer rate and coding, with the expectation that changing of the channel slot or frequency, or both, as may be the case, will reduce the interference toward the designed values.

When an interference condition is found in one link direction, the slot andor the frequency need only be changed in that particular link direction. However, as in the case of fading, interference in one direction of propagation is often accompanied by interference in the other direction of propagation, so a preferred embodiment of the invention contemplates changing slot andor frequency for both directions of propagation.

In one particular mode of the inventive method, the step of sensing the signal quality includes the step of determining the signal bit error rate. In a particular embodiment, the bit error rate is determined by the technique of re-encode-and-compare.

In one context of the use of the invention, the pair of stations includes a gateway and a user terminal, and the signal path includes a spacecraft. In this context, the step of determining the strength and determining the signal quality are measured, for the forward link direction, by the user terminal, and index signals representing a band of the error rate and of the signal level are reported to the gateway. Likewise, the step of determining the strength and the signal quality are measured, for the reverse link direction, by the gateway. The processing for deeming the presence or absence of fade and of interference may be performed at either end of the path, but is preferably performed at the gateway, for both the forward and return links, using the index signals from the user terminal, and the gateway's own received signals. The gateway commands the steps of maintaining the same information rate while increasing the coding gain andor changing at least one of the slot and the frequency of the channel in response to the threshold comparisons.

BRIEF DESCRIPTION OF THE DRAWING

FIG. 3b is a plot which represents the response of the arrangement of FIG. 3a;

DESCRIPTION OF THE INVENTION

Figure 1:
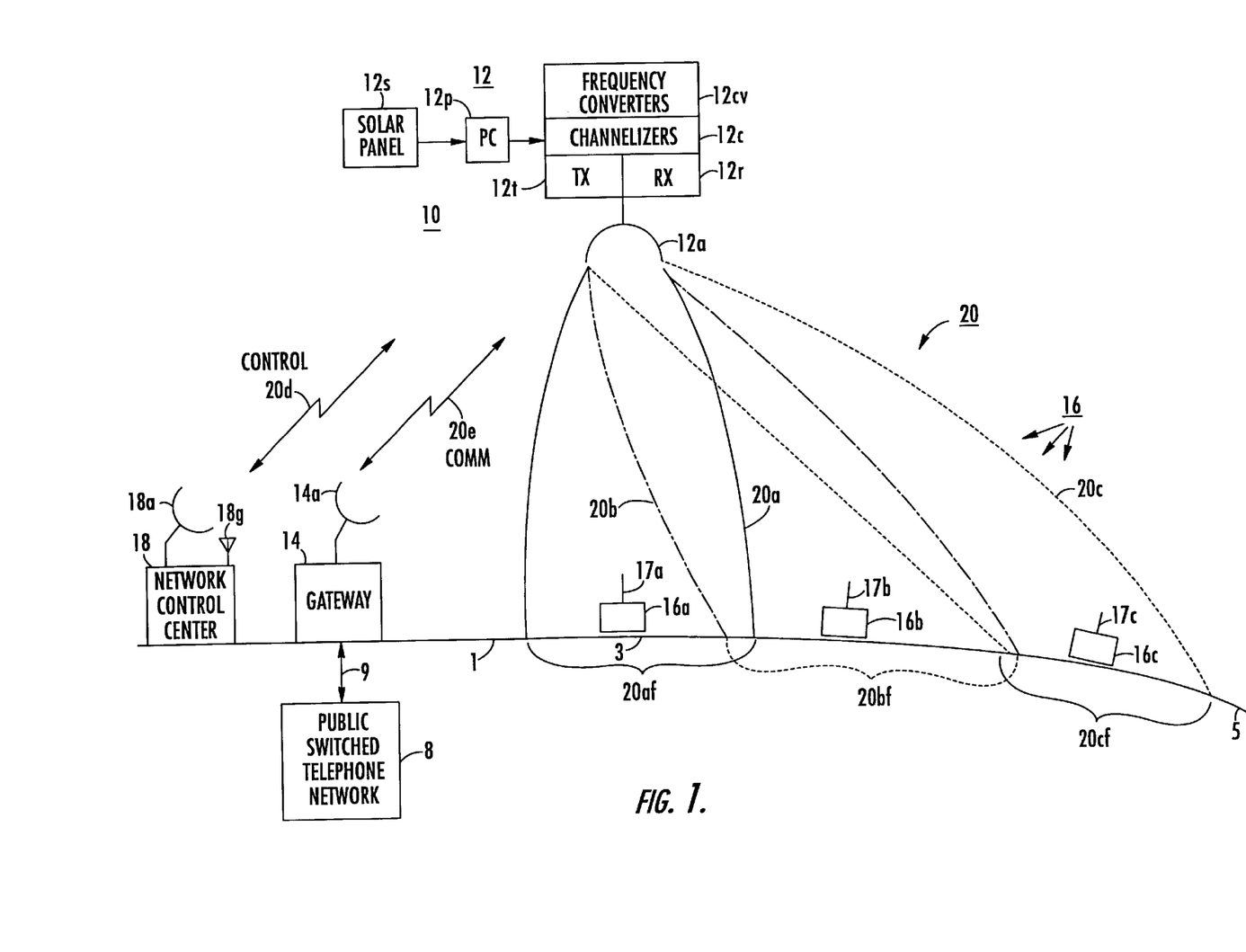
FIG. 1 is a simplified diagram of a spacecraft cellular communication system including user terminals and gateways, with which the invention may be used.

FIG. 1 is a simplified diagram of a spacecraft cellular communication system 10, similar to that of the abovementioned Hudson patent document, in which the invention may be used. In FIG. 1, a spacecraft designated generally as 12 orbits above the surface 1 of the earth. Spacecraft 12 includes a solar panel 12s, which provides electrical energy to power a power converter 12pc, for energizing the spacecraft. The spacecraft 12 also includes a transmitter (TX) and receiver (RX) 12t and 12r, respectively, which are coupled to an antenna arrangement illustrated as 12a. Signals uplinked to a spot beam of antenna 12a are coupled to receiver 12r, and are routed by way of at least frequency-dependent channelizers 12c to a set 12cv of frequency converters. The frequency converters convert the uplink-frequency signals to downlink-frequency signals, which are routed by the channelizers 12c to antenna 12a for downlinking over one or more antenna beams, as described in more detail in the abovementioned Schiavoni, Hatzipapafotiou, Fairholm et al., and Hudson patent documents.

Antenna 12a produces a set 20 including a plurality of nominally-independent, partially overlapping spot beams, some of which are designated 20a, 20b, and 20c. In this context, nominal independence means that for the most part, or subject to mutual coupling and leakage effects, signals transduced by the antenna over a particular spot beam pass through a single corresponding port of the antenna, and not through other ports associated with other spot beams. The mutual coupling and leakage effects tend to cause some blending together of signals associated with the various different spot beams. Those skilled in the art know that the concept of overlapping spot beams, although conceptually useful, is somewhat ill-defined, because the limits of a beam are difficult to ascertain, and all the beams of such an antenna "overlap" to a certain degree. As illustrated in FIG. 1, antenna 20a, when transmitting signals, produces a "footprint" 20af, antenna beam 20b produces a footprint 2Obf, and antenna beam 20c produces a corresponding footprint 20cf on earth's surface 1. Each beam actually produces an infinite number of roughly concentric footprints, each of which represents a slightly lower power density than that of the next inner footprint.

By convention, a "footprint" of an antenna beam is defined for a given power level below the peak power level at the "center" of the beam, and this value is ordinarily −3 dB.

Thus, the footprint for a given spot beam of set 20 is the region on earth's surface 1 within which the power level is no less than 3 dB below the maximum power level in the footprint. Ideally, each spot beam of set 20 will have a footprint which overlaps the footprint of adjacent spot beams in such a manner that no region on surface 1 has a signal power less than 3 dB below the maximum value in the adjacent footprints. It should also be noted that the characteristics of an antenna are identical in transmit and receive modes, and that the same footprint concept applies to a receive spot beam, although it is more difficult to conceptualize.

As mentioned, the footprints 20af, 20bf, and 20cf of FIG. 1 overlap at some defined power level, such as −3 dB. The footprints of the spot beams are large, covering many square miles. Many user terminals or communication system subscribers may be found within each footprint. Each of these subscribers will have a fixed or mobile communication device or "handset," by which they communicate in a bidirectional manner over their respective spot beams. In FIG. 1, the user terminals located within footprint 20af are represented by a single such unit, designated 16a, and having an antenna 17a. Similarly, the user terminals within footprint 20b are represented by a single user terminal 16b, having an antenna 17b, and the user terminals within footprint 20c are represented by a single user terminal 16c, having an antenna 17c.

As illustrated in FIG. 1, a gateway ground station 14 includes an antenna 14a by which the gateway 14 communicates with the spacecraft, either by way of a spot beam or a broader beam, over a bidirectional signal path designated 20e. As described in the Schiavoni, Hatzipapafotiou, Fairholm et al., and Hudson patent references, the gateway 14 provides communication between the spacecraft (or multiple spacecraft) and terrestrial communication systems, represented by path 9 and a block 8 designated as a public switched telephone network (PSTN). As also described in the patent references, a network control center (NCC) is provided in the system, either in a form which is distributed through the system, localized at a single gateway, or as shown, in the form of a stand-alone block 18. NCC 18 includes an antenna 18g, and a further antenna 18a, for communicating control signals to and from system 10 by way of path 20d.

Since many user terminals are provided with service within each spot beam of set 20 of spot beams, some way must be provided for separating the signals destined for, or originating from, each individual user terminal. The separation is provided by providing a plurality of separate signal-carrying channels within each spot beam. One way to provide separate channels is to provide each user terminal with a specific operating frequency within the frequency band carried on the spot beam. This is known as "frequency-division" multiplex. Another way to provide channelization is to divide the information to be communicated into short bursts, and to provide an independent recurrent interval within which each user terminal can communicate. This is known as "time-division" multiplex. Other channelizing schemes are known.

As mentioned, the frequency band or bands which is or are provided for use within a particular spot beam are re-used by other spot beams, which are non-contiguous with the spot beam under consideration. For example, in the arrangement of FIG. 1, spacecraft antenna spot beam 20a (shown by solid-line outline) may communicate (transmit or receive, or both) with those user terminals of set 16 of user terminals within its footprint 20af in a first band of frequencies, spot beam 20b (long-short dash line) may communicate with those user terminals lying within its footprint 20bf over a second band of frequencies, different from the first band. The angle-dependent characteristics of the antenna itself aid in separating the signals of adjacent spot beams, and frequency-selective filters associated the antenna beamformer (not illustrated) further aid in separating the frequencies of the first and second bands. Antenna beam 20c, however, may re-use the first frequency band. In so doing, it reduces the component of isolation between spot beams which is provided by a frequency difference. Put another way, isolation between antenna beams 20a and 20c is provided by the angular difference between the beams, but there is no frequency difference which can provide additional isolation. Thus, re-use of frequencies on non-adjacent spot beams (or on adjacent spot beams, for that matter) may tend to increase the coupling of signals from one spot beam to another. As mentioned above, the system is designed so that the average user terminal operating on an average channel at the expected system loading communicates with the gateway with signal and interference levels which are deemed to be adequate.

Unfortunately, some users may experience less-than-average communication conditions, as regard to fading (reduction of signal level), interference from other users, or both. The effects of fading could be eliminated by substantially increasing the transmitted power at the spacecraft and at the user terminals, but the spacecraft is powered by solar panels, and has other limitations which make it practically impossible to increase the maximum power transmitted by the spacecraft. The user terminals are battery-powered, and have other limitations which make it impractical to increase the maximum transmitted power (although a power controller may make minor adjustments during operation).

It is desirable to mitigate the effects of fading. Fading not only reduces the strength of the signal which is used for communication, but may also increase the strength of whatever interference may be present relative to the desired signal, which may further degrade the communication over the faded channel. Put another way, even if it were possible to increase the transmitted power by improved technology in order to mitigate the effects of fading, such an increase would tend to exacerbate interference between semi-adjacent (or more remote) antenna beams.

Figure 2:
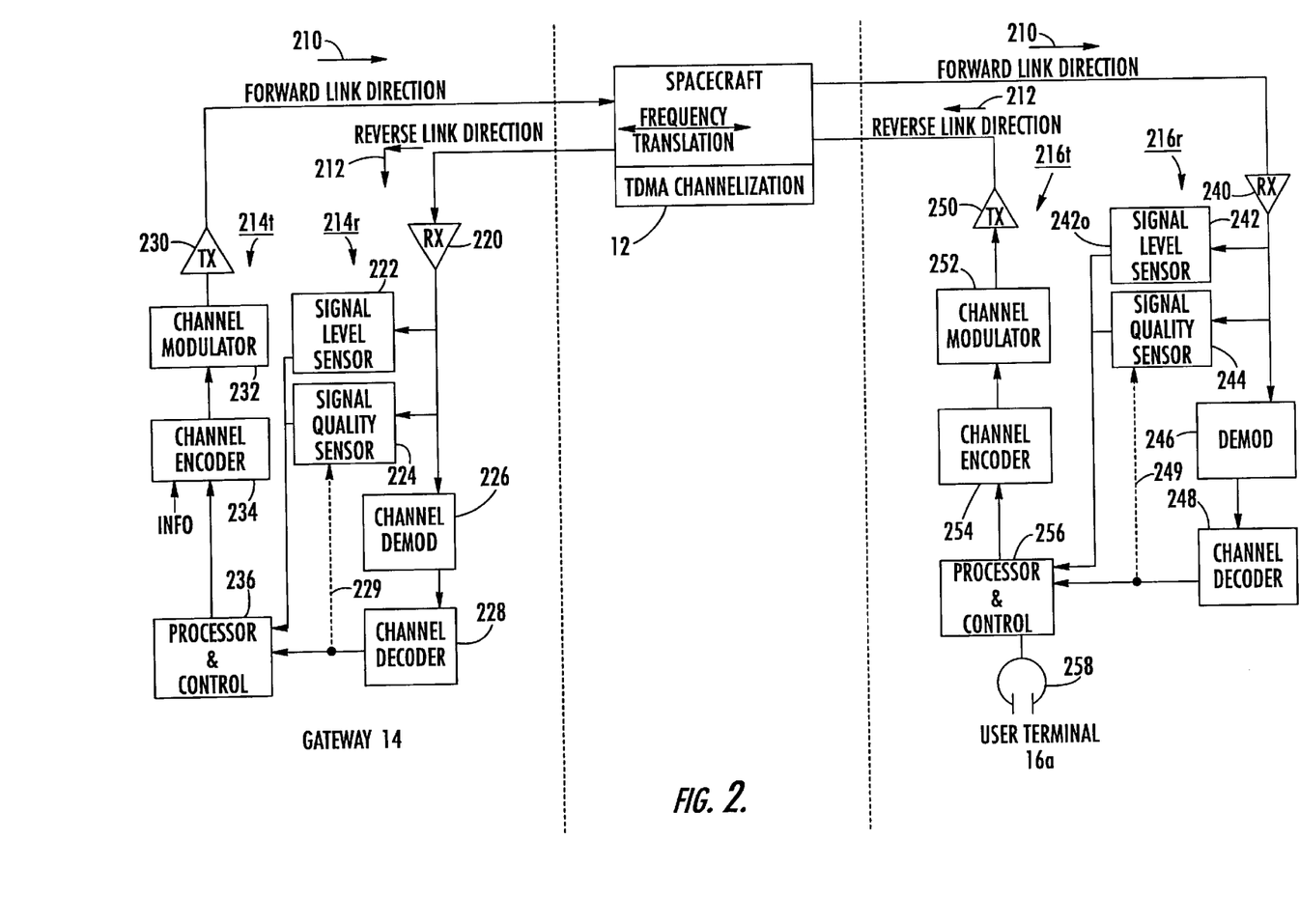
FIG. 2 is a simplified diagram illustrating details of a gateway and a representative user terminal, useful in understanding some details of the invention.

According to an aspect of the invention, the user terminal monitors its received signal level and received signal quality on its assigned communication channel, and the corresponding receiver at the gateway with which it communicates also monitors its received signal level and quality. FIG. 2 is a simplified block diagram of a portion of the communication system of FIG. 1, illustrating some details of a representative user terminal and gateway. In FIG. 2, channelization is by TDMA, and spacecraft 12 provides frequency translation between the forward link direction 210 and the reverse link direction 212. It must be appreciated that the forward and reverse link directions at the spacecraft may each handle hundreds or thousands of individual channels, by which a like number of user terminals, corresponding to user terminal 16a, communicate with the gateway 14. The frequency translation is not particularly relevant to the operation of the system, and operation of the system may be understood by consideration in terms of the forward and reverse link directions 210 and 212, respectively. In FIG. 2, representative gateway 14 includes a receiving portion 214r with a low-noise receiver 220 receiving signals over reverse link 212 of signal path 20e of FIG. 1. The signals received by receiver 220 are applied to a signal amplitude level sensor 222, a signal quality sensor 224, and a channel demodulator (demode 226. Channel demodulator 226 is one of a plurality (others not illustrated) of channel demodulators, each of which operates on a separate channel. Channel demodulator 226 extracts the information signals from one channel of the received signal to produce nominally baseband signal. The demodulated signals are applied to a channel decoder 228, which performs error correction as may be required to extract the information bits from the encoded channel bits. The information signals are coupled to a processor and control circuit illustrated as a block 236, which may route them to a local user, or re-encode them for transmission by way of the spacecraft to a remote gateway or user terminal.

Signal quality sensor 224 of FIG. 2 is illustrated as being coupled to receive RF or IF signal, which is appropriate for the case of determination of signal quality by measurement of signal-to-noise ratio. If, on the other hand, sensor 224 were to determine the signal quality by determination of bit error rate, it could be coupled instead to the output of channel decoder 228, as illustrated by phantom connection line 229.

Also in FIG. 2, a channel encoder 234 of gateway 14 receives information (INFO) signals and control commands, and encodes the information and control signals. The resulting encoded signals are applied to a channel modulator block 232, which modulates the signals, and a transmitter (TX) 230 transmits the signals over the forward link direction 210 to the spacecraft 12, for distribution to user terminals or to other gateways in accordance with the system parameters.

The signals received from spacecraft 12 by the receiver portion 216r of user terminal 16a of FIG. 2 over the forward link direction 210 are applied to a low-noise amplifier 240, which amplifies the received forward-direction signal, and applies it to a signal level detector or sensor 242, a signal quality sensor 244, and a demodulator (demod) 246. The demodulator extracts the information from the carrier signal, and applies it to a channel decoder 248, as described in conjunction with demodulator 226. Channel decoder 248 performs the same function as channel decoder 228 in the gateway 14, and the resulting decoded information and control signals become available to a processor 256 and, if appropriate, by way of a signal path 249 to signal quality sensor 244. Processor 256 receives the commands and information signals, makes the information signals available to the user as instructed by the control signals. Thus, information signals may be routed to a handset earpiece represented as 258. Return information, some of which is described below, is applied to a channel encoder 254, which encodes the signals by forward error correction encoding. The encoded signals are applied to a channel modulator, for modulating the signals to be transmitted onto a suitable carrier (a suitable slot of an existing carrier in the case of TDMA, or a "new" frequency carrier in the case of FDMA), and the modulated carrier is applied to a transmitter (TX) 250. The transmitted signals propagate to the spacecraft by way of the reverse link direction 212, where they are received at receiver 214r of gateway 14.

At user terminal 16a of FIG. 2, signal level detector or sensor 242 produces a signal representative of the strength of the received signal. The signal level detector 242 of user terminal 16a is similar or identical to the signal level detector 222 of gateway 14. Such detectors or sensors are notoriously well known in their analog manifestations, and in the presence of a fixed-gain amplifier 240, a simple diode/capacitor circuit suffices to provide the desired strength-representative signal in analog form. Since the processing of the signal is preferably performed digitally, the analog signal may be converted into digital form. A signal representing the received signal strength is sent from output port 242o of signal level sensor 242 to user terminal processor 256, which performs various control functions known in the prior art, and which also performs functions related to the invention.

Figure 3A:
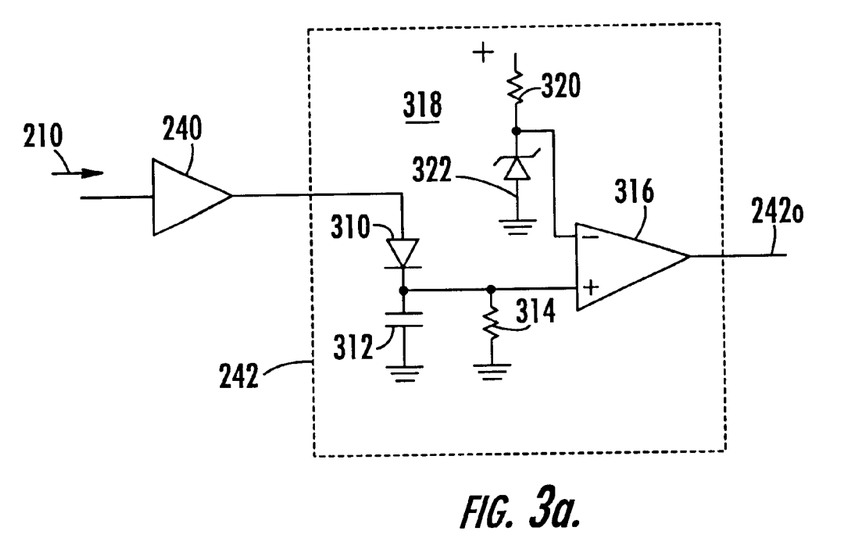
FIG. 3a represents a physical embodiment equivalent to a processor-implemented amplitude comparison in accordance with an aspect of the invention.

FIG. 3a illustrates one way to produce a digital signal representative of the signal strength, which may be used for either signal level sensor 222 or 242 of FIG. 2. For definiteness, the signal strength sensor of FIG. 3a is designated 242. It should be understood that the arrangement of FIG. 3a merely represents a possible physical embodiment which produces something of the same effect that is actually performed by digital signal processing. In FIG. 3a, the received signal is applied to the series combination of a diode 310 and a capacitor 312, which produces a positive voltage or charge on the capacitor in response to applied signal. A resistor 314 establishes the discharge time constant. A comparator or amplifier 316 has it noninverting (+) input port connected to the resistor 314, and its inverting input port coupled to a reference voltage source 318 represented by a zener diode 322 serially coupled with a resistor 320 as a voltage divider between a + voltage and ground.

Figure 3B:
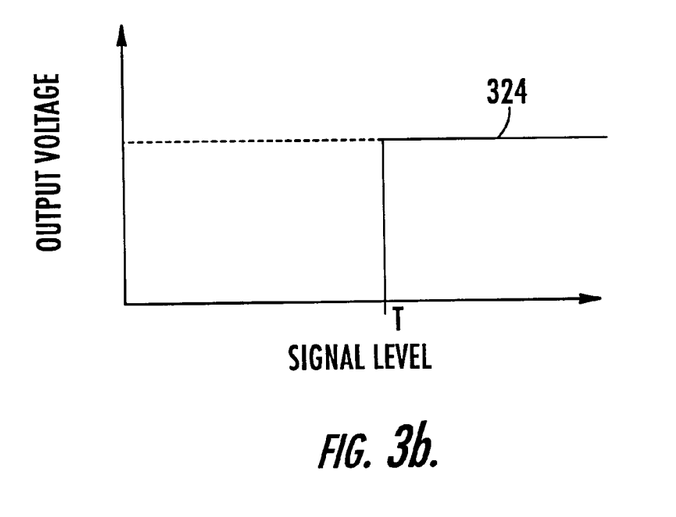

The reference voltage is the zener voltage. So long as the received signal strength is below a threshold level T as illustrated in the plot of FIG. 3b, the amplifier output will be zero or negative, and when the threshold T is exceeded by the received signal level as measured across the capacitor 312, the output of comparator or amplifier 316 will rise to a positive or logic high level. The two-level output of signal level detector 242 of FIG. 3a may be viewed as a one-bit representation of the state of the received signal, namely either above or below the threshold value. The threshold value is set to correspond to a value which is deemed to represent a somewhat faded signal condition. It should be noted that a simple signal-to-noise measurement is subject to error in the presence of strong interference from semi-adjacent or more remote antenna beams and therefore, even though the signal quality sensors 224 and 244 of FIG. 2 may be of any type, the function is preferably accomplished, as mentioned above, by determining the bit error rate (BER). One way to accomplish the determination of BER is by the know process of decoding the signal, re-encoding the decoded signal, and comparing the two coded signals.

Figure 5:
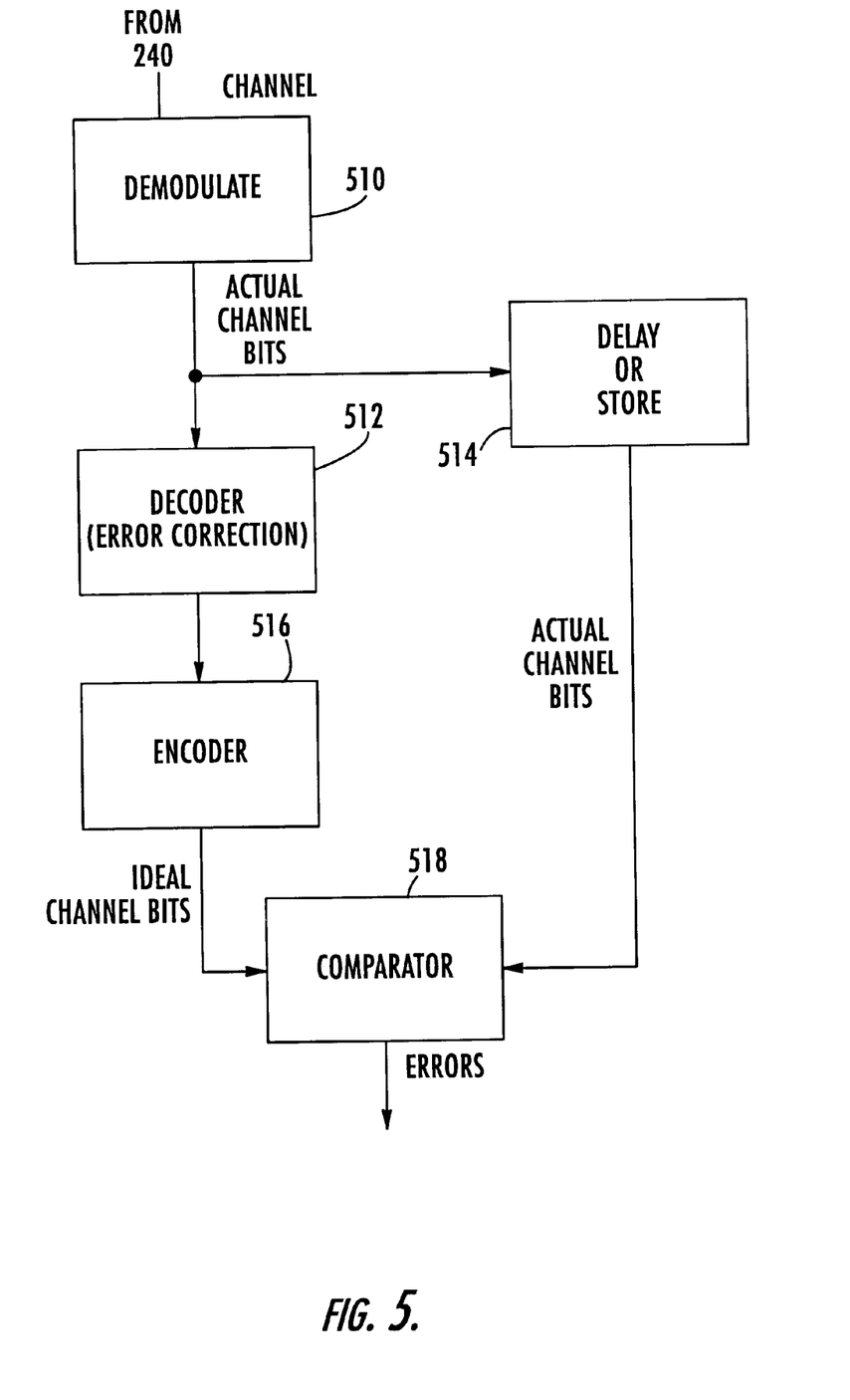
FIG. 5 is a simplified block diagram illustrating signal bit error rate determination by reencode-and-compare.

FIG. 5 is a simplified embodiment representing the digital processing for performing such a BER measurement. In FIG. 5, the channel signals from receiver 220 or 240 of FIG. 2 are applied to a demodulator 510, Demodulator 510 produces actual channel bits, including bits which are destroyed as a result of channel imperfections. The actual channel bits are applied to an error correcting decoder illustrated as a block 512 and to a delay or storage device illustrated as 514. Channel decoder 512 processes the actual channel bits, using error correction to correct the errors introduced by the channel, so that "perfect" or ideal bits appear at its output. The ideal bit stream at the output of decoder 512 is applied to an encoder 516, which applies the same encoding which was used at the transmitting end of the channel, as at block 234 of FIG. 2. The result is ideal channel bits corresponding to the signal originally introduced into the channel. These ideal bits are compared in a comparator 518 with the stored actual channel bits, to thereby produce an indication of the number of errors in the actual channel bits, from which bit error rate (BER) can be determined. It will be noted that demodulator 510 of FIG. 5 corresponds in function to demodulators 226 and 246 of FIG. 2, and that decoder 512 corresponds to decoders 228 and 248, so their functions may be combined, as suggested by alternative signal paths 229 and 249 of FIG. 2.

The signal produced by signal quality detector or sensors 224 and 244 of FIG. 2, representing the signal quality, may be quantized to one bit (good/bad) or to more than one bit (multiple levels of quality). The signal level signals produced by signal level sensor 222 and the signal quality signals produced by signal quality sensor 224 of gateway 14 of FIG. 2 are applied to gateway processor 236 for processing. The signal level signals produced by signal level sensor 242 and the signal quality signals produced by signal quality sensor 244 of representative user terminal 16a are applied to user terminal processor 256.

Processor 256 of user terminal 16a of FIG. 2 processes the signal strength and signal quality signals from blocks 242 and 244, and encodes them for transmission to the gateway 14 of FIG. 2 by applying them to channel encoder 254. The encoded user terminal amplitude and signal quality signals are transmitted by way of the reverse link direction path or paths 212 to gateway 14. At gateway 14, these two signals, together with other control and status signals, and user information signals, are demodulated and decoded. The user terminal signal strength and signal quality signals are routed to gateway processor 236, where they are evaluated.

Signal level detector 222 of gateway 14 of FIG. 2 produces a signal representative of the received signal strength, in any manner, such as the one described in conjunction with FIGS. 3a and 3b. Signal quality sensor 224 determines the quality of the received signal, as by determining the bit error rate (BER) as described above in conjunction with FIG. 5. The signal strength, signal quality, and other signals produced by signal level and quality sensor blocks 222 and 224 of FIG. 2 are applied to processor/controller block 236, which performs various communication system control functions, such as maintaining a log of the spot-beam locations of the various user terminals in the system, allocating TDMA time slots to the various transmissions, and coordinating with other gateways and with a network control center (NCC). In addition to whatever other functions it may perform, processor 236 performs the processing, described below, for making a determination of the condition of the forward and return links, and in response to that determination, controls the signal processing to mitigate the effects of poor link performance.

It would be possible for processing associated with evaluation of the signal link conditions to be performed at the user terminal end of the link, but it is deemed to be better to perform most of the processing at the gateway. In order for the gateway 14 of FIG. 2 to obtain the information relating to the signal level and signal quality at the user terminals), each user terminal, including representative user terminal 16a of FIG. 2, transmits the signal level information and the signal quality information back to the gateway. In order to minimize the information flow attributable to these sensor signals, a minimum amount of information is transmitted, as for example a one-bit signal level as described in conjunction with FIGS. 3a and 3b may suffice to indicate that the level is within or without a range of levels, and the bit error rate may be similarly represented by an index signal representing a range of values.

Gateway processor 236 of FIG. 2 determines the presence of poor signal quality in either the forward or reverse link direction, by evaluating the index signals returned from the various user terminals, and for the reverse direction links by evaluating its own signal level and signal quality for each reverse channel. If poor signal quality is found in conjunction with a fade in one signal direction, the poor signal quality is deemed to be attributable to the fade, and gateway processor 236 commands an increase in the coding gain. As mentioned above, it would be desirable to increase the maximum transmitted signal power, but practical considerations prevent such an increase, so an increase in coding gain is deemed to be the only convenient way to improve the signal quality. An increase of the coding gain is achieved by increasing the number of coding bits, without a corresponding increase in the number of information bits. The coding bits may be, for example, error correction bits. Those skilled in the art will recognize that there is a tradeoff between the coding-bit overhead and the maximum data throughput rate of the system. In situation in which a single channel or some of the channels of a system have excess capacity, however, such a tradeoff is not disadvantageous. Since a change in the coding gain requires a change of the coding parameters, both the transmissions and the receptions on the affected channel must be conformed to the coding characteristics for increased coding gain, and consequently a change in coding gain, when commanded for one direction of transmission, requires that the coding parameters be changed in both the relevant channel of the gateway and in the corresponding user terminal. Consequently, a change in coding gain, even in one direction of propagation, requires a command to change parameters at both ends of the link. Thus, the gateway must send appropriate commands to the associated user terminal. In a spacecraft cellular communication system using a GSM-based air interface protocol, the necessary commands may be sent from the gateway to the user terminal by way of the Spacecraft Slow Associated Control Channel (S-SACCH), or by way of the Spacecraft Fast Associated Control Channel (S-FACCH)

Since a fade on a particular channel is likely to affect both forward and reverse directions of transmission, processor 236 commands the new coding gain for both directions of propagation (for both the forward and reverse links) for the affected channel. It should be emphasized that only one channel is being discussed, and other channels flowing in the forward and reverse link directions, which are unaffected by fade, will maintain their previous coding gain. When the fade is no longer sensed, the coding gain may revert to the default or lesser coding gain. In a particular embodiment of a communication system embodying the invention, the high-coding-gain condition is maintained until the end of the user terminal's call, which simplifies the processing, and prevents the possibility of continued switching between high- and normal-coding-gain.

If gateway processor 236 of FIG. 2 finds that there is poor signal quality in one (or both) of the forward or reverse link directions for the channel in question, without a corresponding fade, the poor signal quality is deemed to be attributable to interference. In the presence of interference, the coding gain is not changed, but instead the channel is switched. In a TDMA context, switching the channel has the meaning of assigning a different time slot to the various transmissions of the gateway to the user terminal in question, and from the user terminal in question to the gateway. The switching or reassignment of TDMA channel is well known in the art, and requires no further discussion. In the context of frequency-division multiplexing, changing of the channel is similarly simple and well known. Switching of the channel may reduce co-frequency interference and ameliorate the poor signal quality situation.

Figure 4:
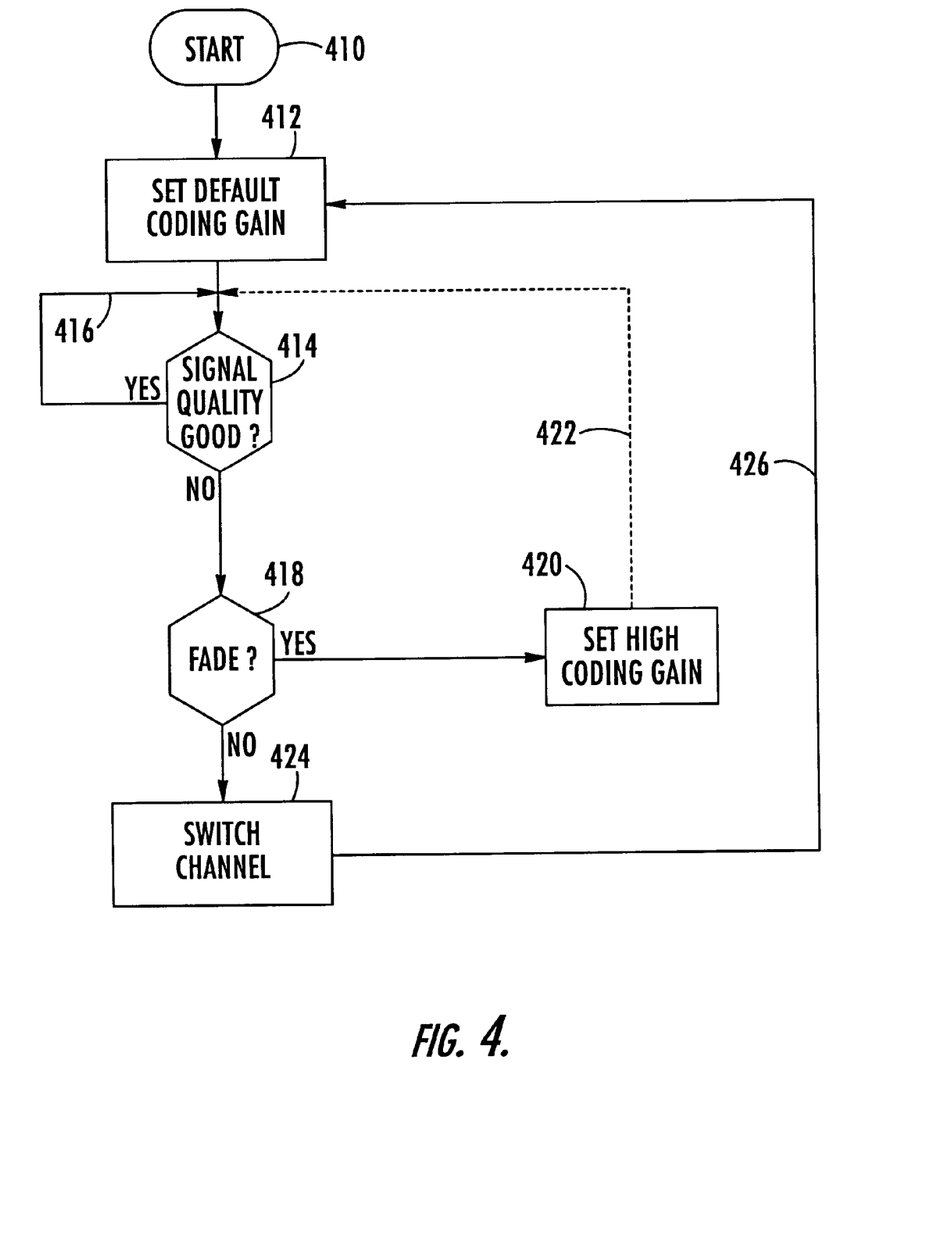
FIG. 4 is a simplified flow chart or diagram representing logic flow for adjusting either the coding gain, the channel, or both, in at least one path direction, in response to signal quality.

FIG. 4 is a simplified flow chart or diagram representing the processing performed (by gateway processor 236 of FIG. 2) in each channel in response to the signal strength and signal quality signals. In FIG. 4, the logic begins at a START block 410, and proceeds to a block 412, which represents the setting of a default (lower) coding gain for the channel. From block 412, the logic flows to a decision block 414, which represents the reading of the signal quality information from both the user terminal 16a and from the gateway 14, and a determination of whether the signal is good or not. If the signal is good, the logic leaves decision block 414 by the YES output, and proceeds by way of a logic path 416 back to block 414. If the signal is of poor quality, the logic leaves decision block 414 by the NO output, and proceeds to a further decision block 418. Block 418 determines whether a fade condition exists or not. If there is a fade, the poor signal quality is deemed to be attributable to the fade, the logic leaves decision block 418 by the YES output, and flows to a block 420. Block 420 represents the setting of the channel in question to a high coding gain condition, preferably for the duration of the call, in which case block 420 is the end of the logic flow. Block 420 may instead set the high coding gain for a predetermined number of iterations, so that the coding gain does not frequently attempt to revert to the lower default value. If a predetermined number of iterations are used, the logic flows from block 420 by way of a logic path 422 back to decision block 414 for another iteration. At the expiration of the predetermined number of iterations or clock cycles, the low coding gain is again set by block 420, and a determination is made during the next iteration as to whether the poor quality condition continues to exist or has passed. If it has passed, decision block 414 routes the logic by way of path 416, and if the signal quality continues to be poor, the logic is again routed to decision block 418. If the fade is still present, the coding gain is again set high for the predetermined duration. As mentioned, if the coding gain is set high for the duration of the call, block 420 is the end of the logic path, and the logic begins anew at START block 410 at the beginning of each new call.

If the signal quality is not good, and no fading is detected by decision block 418 of FIG. 4, the poor signal quality is deemed to be attributable to interference on the current channel. The logic in this situation leaves decision block 418 by the NO output, and arrives at a block 424. Block 424 represents the commanding of the switching of the transmission from the current channel to another channel. When the transmissions are switched to another channel, the current channel is no longer in use, so the logic illustrated in FIG. 4 for the current channel is no longer in use. However, a corresponding logic flow for the new channel is initiated, which sets the default low-gain condition, and the logic performs in the new channel as described above.

Other embodiments of the invention will be apparent to those skilled in the art. For example, the selection of a new channel may be performed by various different methods, depending upon the nature of the system in question. While simplified representations of the invention are described for simplicity, it will be understood that the invention may be used in extremely complex communication systems, in which the processors perform many tasks other than those described. Processing is preferably performed in digital rather than analog form, and when in digital form, preferably in parallel bit form.

Thus, the invention, in general, lies in a method for operating a communication system (10) which is subject to fading and interference. The communication system (10) includes an arrangement (242) at a user terminal (16a), and preferably all user terminals (16), and at the gateways (14), for determining the received signal strength. If the received signal strength is low, a fade is declared (416). The received signal quality is also determined, as for example by determining the bit error rate of the signal (244). If the signal quality is deemed to be poor and also faded, the poor signal quality is deemed to be attributable to the fade, and the coding gain of the path is increased, as for example by increasing the bearer rate without increasing the information rate, andor by applying additional error correction encoding. If the signal quality is deemed to be poor in the absence of fading, the poor signal quality is deemed to be due to interference. If interference is found in this way, the carrier channel is changed, as for example by changing slot allocation in a TDMA system or channel frequency in an FDMA system, without change in the coding gain. In a particularly advantageous mode of the invention, the user terminal encodes the signal level and signal quality information and transmits corresponding indices to a gateway, at which the necessary processing is performed, and which commands the user terminal. In a preferred mode, both directions of signal propagation are modified in response to a fade or poor-quality signal detected at either end of the system.

Thus, a method for maintaining the quality of a signal transmission over a signal path extending between a pair of stations, in accordance with the invention, includes the step of sensing the strength (242) of at least a portion (the signal in the channel in question) of the received signal resulting from traversal of the path (210, 212) in a first direction. The signal is deemed not to have faded if the signal level remains above a predetermined threshold (T), and is deemed to have faded if the signal level drops below the predetermined threshold. The signal quality of the received signal is estimated, sensed or determined (224, 244), and deemed to be of poor quality if the quality drops below a predetermined threshold. For this purpose, the signal quality is compared with a threshold. The comparison may be continuous, or it may be made from time to time. The signal quality determination may be made by determining the bit error rate in the relevant link direction. If the signal level is indicative of a fade, and the signal quality is poor, the same information rate is maintained while increasing the coding gain in at least the first direction. In one embodiment of the invention, the increase of coding gain is accomplished by doubling the bearer rate while maintaining the information rate. If the signal level is not indicative of a fade, and the signal quality is poor, the poor signal quality is deemed to be attributable to interference, and change of at least one of the slot and the frequency of the channel is commanded, while maintaining the bearer rate and coding.

In a most preferred embodiment of the invention, the pair of stations includes a gateway and a user terminal, and the signal links include a spacecraft. In this embodiment, the first direction is a forward link direction, and the step of determining the strength and determining the signal quality are measured by the user terminal on signal flowing in the forward link direction. Index signals representing a band of the error rate and the signal level are reported from the user terminal to the gateway; and the gateway commands the steps of maintaining the same information rate while increasing the coding gain and changing at least one of the slot and the frequency of the channel, in response to the index signals.

In a particularly advantageous embodiment of the invention, the coding gain is changed for both link directions in response to fade in only one link direction, and the channel change is commanded for both link directions in response to interference in either link direction.

What is claimed is:

1. A method for maintaining the quality of a signal transmission over a signal path extending between a pair of stations, said method comprising the steps of;
    sensing the strength of at least a portion of the received signal resulting from traversal of said path in a first direction, deerning the signal not to have faded if the signal level remains above a predetermined threshold, and deeming the signal to have faded if the signal level drops below said predetermined threshold;
    estimating the signal quality of said received signal, and deeming the signal to be of poor quality if the quality drops below a predetermined threshold;
    if the signal level is indicative of a fade, and the signal quality is poor, maintaining the same information rate while increasing the coding gain in at least said first direction;
    if the signal level is not indicative of a fade, and the signal quality is poor, deeming the poor signal quality to be attributable to interference, and changing at least one of the slot and the frequency of the channel, while maintaining the bearer rate and coding.

2. A method according to claim 1, wherein said step of estimating the signal quality includes the step of determining the bit error rate in said first direction.

3. A method according to claim 1, wherein said pair of stations includes a gateway and a user terminal, and said signal path includes a spacecraft, and wherein:
    said first direction is a forward link direction;
    said step of determining the strength and estimating the signal quality are measured by said user terminal on signal flowing in said forward link direction, and index signals representing a band of the error rate and said signal level are reported to said gateway; and
    said gateway commands said steps of maintaining the same information rate while increasing the coding gain and changing at least one of the slot and the frequency of the channel in response to said index signals.

4. A method for controlling the transmission and touting of signals in a communication system including plural channels for the independent flow of coded signals between pairs of stations, said method comprising the steps of:
    at one of said stations, comparing, with a predetermined threshold, the received signal strength of signals from the other one of said stations, and deeming the signals to have faded if said received signal strength is below said threshold;
    at said one of said stations, comparing the quality of said received signal from said other one of said stations on one of said channels with a threshold, and deeming the signal to be of poor quality if said quality is below a predetermined threshold;
    if said signals are deemed to have faded, increasing the coding gain of said signals;
    if said signals are not deemed to have faded, and are of poor quality, switching said signals from the current one of said channels to another channel.

5. A method according to claim 4, wherein step of increasing the coding gain includes the step of increasing the bearer rate, while maintaining the information rate.

6. A method according to claim 4, wherein said channels lie, at least in part, in different time slot of a time-division-multiplex scheme; and
    said step of switching said signals from the current channel includes the step of switching the signals from the current time slot allocation to another time slot allocation.

7. A method according to claim 4, wherein said channels lie, at least in part, in different frequency bands of a frequency-division-multiplex scheme; and
    said step of switching said signals from the current channel includes the step of switching the signals from the current frequency band to another frequency band.

8. A method according to claim 4, further comprising the step of:
    in conjunction with increasing the coding gain of the signals flowing in a first direction between said pairs of stations, increasing the coding gain of the signals flowing in a second direction, opposite to said first direction.

9. A method according to claim 4, further comprising the step of:
    in conjunction with switching the channel allocated to signals flowing in a first direction between said stations of said pair, switching the channel allocated to signals flowing in a second direction, opposite to said first direction.

* * * * *